United States Patent
Kulandaivel et al.

(10) Patent No.: US 11,714,474 B2
(45) Date of Patent: *Aug. 1, 2023

(54) CLOCK CONTROL TO INCREASE ROBUSTNESS OF A SERIAL BUS INTERFACE

(71) Applicant: Robert Bosch GmbH, Stuttgart (DE)

(72) Inventors: Sekar Kulandaivel, Silver Spring, MD (US); Shalabh Jain, Pittsburgh, PA (US); Jorge Guajardo Merchan, Pittsburgh, PA (US)

(73) Assignee: Robert Bosch GMBH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,660

(22) Filed: Dec. 27, 2021

(65) Prior Publication Data

US 2022/0121264 A1    Apr. 21, 2022

Related U.S. Application Data

(63) Continuation of application No. 16/698,675, filed on Nov. 27, 2019, now Pat. No. 11,209,891.

(51) Int. Cl.
*G06F 1/3237*    (2019.01)
*G06F 1/08*    (2006.01)
*H04L 12/40*    (2006.01)
*G06F 1/12*    (2006.01)

(52) U.S. Cl.
CPC .............. *G06F 1/3237* (2013.01); *G06F 1/08* (2013.01); *G06F 1/12* (2013.01); *H04L 12/40013* (2013.01); *H04L 12/40032* (2013.01); *H04L 2012/40215* (2013.01)

(58) Field of Classification Search
CPC . G06F 1/3237; G06F 1/08; G06F 1/12; H04L 12/40012; H04L 12/40032; H04L 2012/40215
See application file for complete search history.

(56) References Cited

U.S. PATENT DOCUMENTS

| | | |
|---|---|---|
| 6,115,831 A | 9/2000 | Hanf et al. |
| 6,161,190 A | 12/2000 | Fischer et al. |
| 6,175,931 B1 | 1/2001 | Hornung |

(Continued)

OTHER PUBLICATIONS

Bozdal, Mehmet et al. A Survey on CAN Bus Protocol Attacks, Challenges, and Potential Solutions. 2018 International Conference on Computing, Electronics, & Communications Engineering (iCCECE) (2018) 201-205. (Year 2018).

(Continued)

*Primary Examiner* — Glenn A. Auve
(74) *Attorney, Agent, or Firm* — Dickinson Wright PLLC

(57) ABSTRACT

An electronic control unit (ECU) includes a processor, a Controller Area Network (CAN) controller, clock gating logic, and security gating logic. The CAN controller having a status and configured to receive data and control signals from the processor, and a clock signal, package the data to create a CAN protocol frame held in at least one transmit buffer, and shift the CAN protocol frame to a CAN transceiver that is configured to transmit the CAN protocol frame to a CAN bus. The security gating logic configured to, in response to the status of the CAN controller being active, inhibit disabling the clock signal.

20 Claims, 11 Drawing Sheets

(56) References Cited

U.S. PATENT DOCUMENTS

| | | | |
|---|---|---|---|
| 6,317,841 | B1 | 11/2001 | Nagae et al. |
| 10,956,356 | B1 | 3/2021 | Kulandaivel et al. |
| 11,209,891 | B2 * | 12/2021 | Kulandaivel ............. G06F 1/12 |
| 2004/0170195 | A1 | 9/2004 | Slivkoff et al. |
| 2014/0068231 | A1 | 3/2014 | Saeki |
| 2016/0004292 | A1 | 1/2016 | Sharda et al. |
| 2016/0098077 | A1 | 4/2016 | Itou et al. |
| 2019/0138491 | A1 | 5/2019 | Nakamuta et al. |
| 2019/0361514 | A1 | 11/2019 | Kongari et al. |
| 2019/0362082 | A1 | 11/2019 | Schramm et al. |
| 2020/0012820 | A1 | 1/2020 | Nara et al. |

OTHER PUBLICATIONS

Groza, Bogdan and Pai-Stefan Murvay. Security Solutions for the Controller Area Network Bringing Authentication to In-Vehicle Networks. IEEE Vehicular Technology Magazine 13 (2018) 40-47. (Year 2018).

Nowdehi, Nasser et al. In-vehicle CAN message authentication An evaluation based on industiral criteria. 2017 IEEE 86th Vehicular Technology Conference (VTC—Fall) (2017) 1-7. (Year 2017).

P. Murvay and B. Groza, Security Shortcomings and Countermeasures for the SAE J1939 Commercial Vehicle Bus Protocol, in IEEE Transactions on Vehiclular Technology, vol. 67, No. 5, pp. 4325-4339, May 2018. (Year 2018).

Siddiqul, Ali Shuja et al. Secure communication over CANBus. 2017 IEEE 60th International Midwest Symposium on Cicuits and Systems (MWSCAS) (2017) 1264-1267. (Year 2017).

Wang, Qiyan and Sanjay Sawhney. VeCure A practical security framework to protect the CAN bus of vehicles. 2014 International Conference on the internet of Things(IOT) (2014) 13-18. (Year 2014).

* cited by examiner

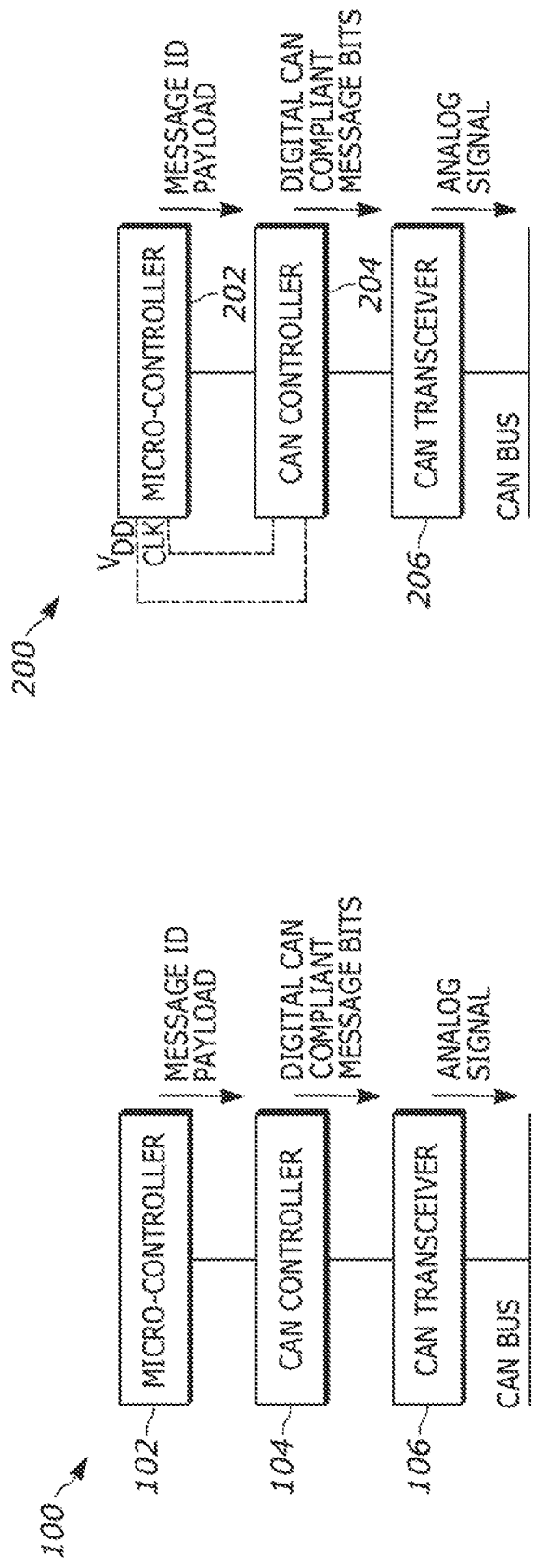

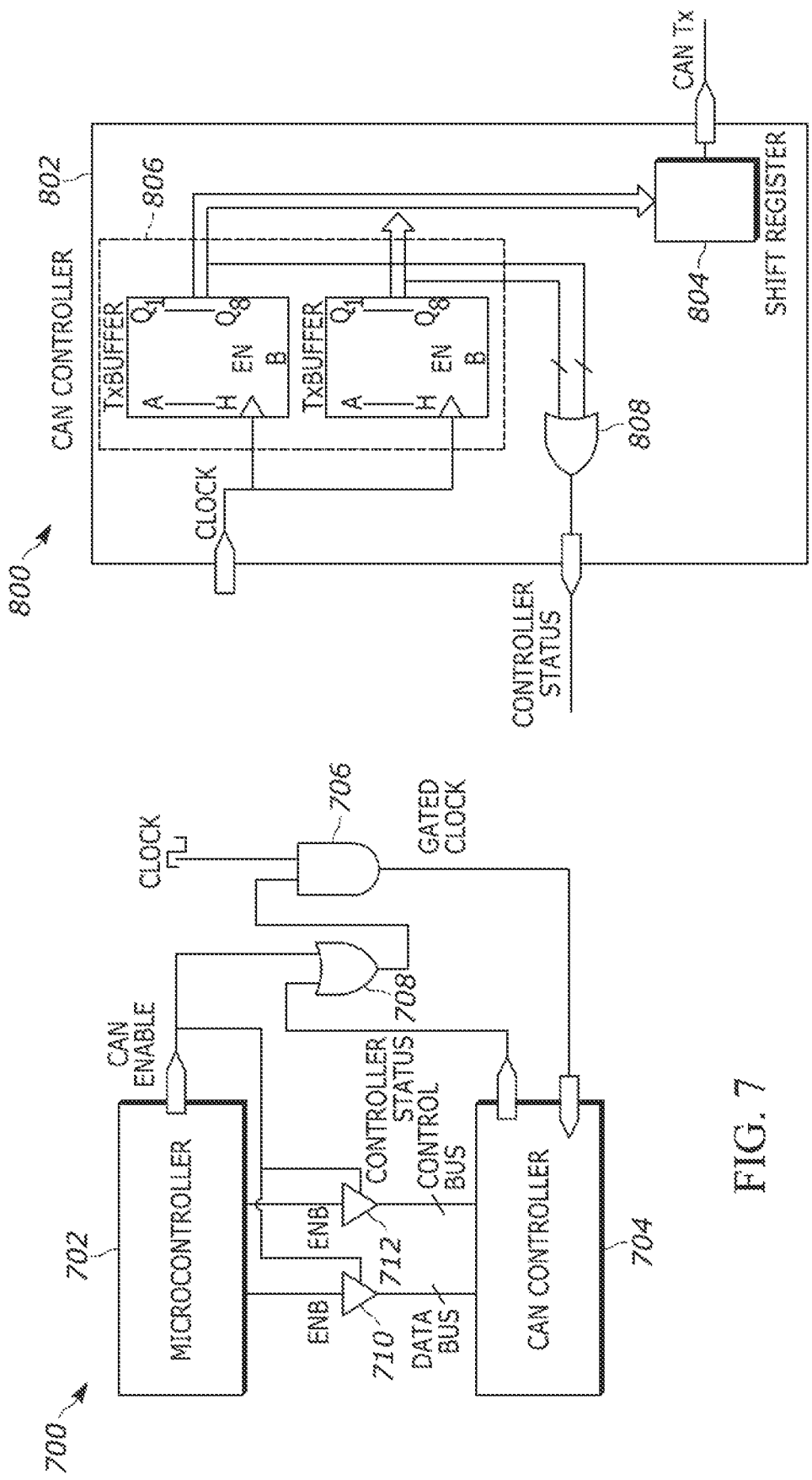

CLOCK CONTROL TO INCREASE ROBUSTNESS OF A SERIAL BUS INTERFACE

CROSS-REFERENCE TO RELATED APPLICATION

This application is a continuation of U.S. application Ser. No. 16/698,675 filed Nov. 27, 2019, the entire disclosure of which is incorporated by reference herein.

TECHNICAL FIELD

This invention relates generally to a system and method to increase robustness of a message-based protocol serial bus interface via enhanced gating and idle clock detection.

BACKGROUND

A modern vehicle contains multiple of Electronic Control Units (ECUs). Most of these ECUs communicate via a communication bus using a communication protocol (e.g., Controller Area Network (CAN) protocol). The topology of multiple ECUs communicating via a communication bus creates an in-vehicle network which controls many systems of the vehicle and has resulted in many advances in vehicle operation. However, along with the additional functionality, these in-vehicle networks have become a prime target for automotive network attacks.

SUMMARY

An electronic control unit (ECU) includes a processor, a Controller Area Network (CAN) controller, clock gating logic, and security gating logic. The CAN controller having a status and configured to receive data and control signals from the processor, and a clock signal, package the data to create a CAN protocol frame held in at least one transmit buffer, and shift the CAN protocol frame to a CAN transceiver that is configured to transmit the CAN protocol frame to a CAN bus. The clock gating logic may be configured to selectively disable a clock signal to the CAN controller based on a control signal from the processor. The security gating logic configured to, in response to the status of the CAN controller being active, inhibit disabling the clock signal.

An electronic control unit (ECU) includes a processor, a controller, clock gating logic, and security gating logic. The controller may be configured to receive data and control signals from the processor, package the data to create a protocol frame held in at least one transmit buffer, and serially shift the protocol frame to a transceiver via a shift buffer, the transceiver is configured to receive serial data from the controller and transmit a signal on a bus. The clock gating logic may be configured to selectively disable a clock to the controller based on a signal from the processor. The security gating logic configured to, in response to a status of the controller being active, inhibit disabling the clock.

An electronic control unit (ECU) includes a processor, a controller, clock gating logic, security gating logic, and reset logic. The controller may be configured to receive data and control signals from the processor, package the data to create a protocol frame held in at least one transmit buffer, and serially shift the protocol frame to a transceiver via a shift buffer, the transceiver is configured to receive serial data from the controller and transmit the protocol frame on a bus. The clock gating logic may be configured to selectively disable a clock to the controller based on a signal from the processor. The security gating logic may be configured to, in response to a status of the controller indicating active transmission of the protocol frame, inhibit disabling the clock. The reset logic may be configured to reset the at least one transmit buffer when the signal transitions from active to inactive.

BRIEF DESCRIPTION OF THE DRAWINGS

FIG. 1 is a block diagram of a Controller Area Network (CAN) stack in an electronic control unit (ECU).

FIG. 2 is a block diagram of a CAN stack in an ECU having a coupled power and clock.

FIG. 7 is a block diagram of clock, data bus, and control bus gating via status and enable for a CAN controller.

FIG. 8 is a block diagram of a transmit buffer status based on a value of the transmit buffers.

DETAILED DESCRIPTION

Figure 3:
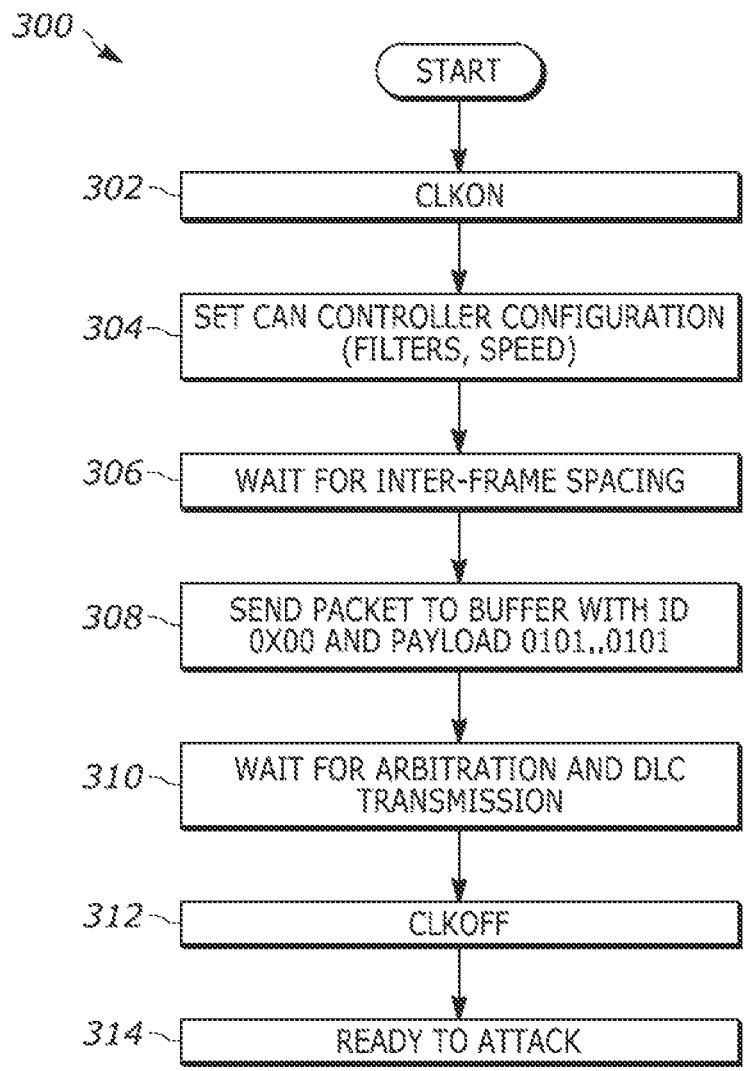
FIG. 3 is a flow diagram of an attack on a CAN controller via arbitrary bit insertion.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

Security mechanisms to prevent remote software based attacks on nodes connected to the Controller Area Network (CAN) bus assume that adversarial actions are limited to utilization of messages that adhere to the physical layer specifications in ISO-11898/1, ISO-11898/2, ISO-11898/3, etc that govern message framing and timing. However, such an assumption is no longer sufficient for ECUs utilizing a CAN bus. This disclosure illustrates software methods that can be utilized to transmit messages not in compliance with the CAN specification by abusing CAN controller functionality. And, novel methods to efficiently protect a CAN controller from such attacks using a variety of software and hardware based control structures are disclosed. The concepts are illustrated via a specific CAN architecture, however the concepts also apply to other CAN architectures such as Single Wire CAN (SW-CAN or SWC), Flexible Data Rate CAN (FD-CAN or CAN FD), J1939, and ISO 11783. Also, these concepts can be applied to other serial bus architectures such as Ethernet (IEEE802.11 and variants thereof), Local Interconnect Network (LIN), Flexray (ISO 17458-1 to 17458-5).

A CAN bus is a central communication network that is used many systems including automotive systems, aerospace systems, consumer systems, and industrial systems. The addition of remote interfaces on some nodes on the bus has created vulnerabilities and opened these systems to remote attacks. These vulnerabilities have become an operational and security concern. Thus, improving security of the CAN bus has become an important topic as technology advances and autonomy of vehicle operation increases.

Due to the original design principles for CAN and computational capabilities of a typical node on a network, the difficulty of integrating security into the network has significantly increased. Techniques to address this difficulty include novel key agreement mechanisms, lightweight authentication schemes, and use of a dedicated Intrusion Detection System (IDS). Several of these mechanisms assume the adversary actions are restricted to compromising software on the nodes, thereby providing the attacker the ability to inject arbitrary CAN compliant messages. Such assumptions allow optimization of the design of security mechanisms.

However, modern integrated CAN interfaces can allow an adversary to utilize existing software interfaces to maliciously inject messages that are not compliant with the CAN protocol. This includes arbitrary bit injection or insertion of partial (erroneous) messages. Existing defense mechanisms are ineffective against this new class of adversaries. Here, systems and methods are disclosed that can be used to prevent misuse of the CAN controller, thereby limiting adversary control.

Turning to software based bit insertion, the layer structure of a traditional node on a CAN bus is illustrated in FIG. 1. FIG. 1 is a block diagram of a Controller Area Network (CAN) stack 100 in an electronic control unit (ECU). The CAN stack 100 includes a processor 102 such as a microcontroller, embedded processor, processor, application specific integrated circuit (ASIC), Field programmable gate array (FPGA), or similar device. The processor 102 communicates with a CAN controller 104 by sending and receiving data such as Message ID and data Payload. The CAN transceiver 106 is the interface between the CAN protocol controller 104 and the physical wires of the CAN bus lines. The CAN bus lines are typically 2 wire (e.g., twisted pair) but can be implemented as single wire CAN (e.g., GM-LAN) or 4 wire (including common ground). The interface between the CAN controller 104 and the CAN transceiver 106 may be via a 2 wire dedicated TX-RX, RX-TX in which the transmit (TX) on the CAN controller 104 is coupled with the receive (RX) of the CAN transceiver 106, and RX on the CAN controller 104 is coupled with the TX of the CAN transceiver 106.

As with traditional layered design, a traditional and common assumption is that the interactions between the layers occurs only at the messaging interfaces. In a traditional CAN stack, the CAN controller monitors the bus for transmitted packets and guarantees the compliance of all transmitted messages to the CAN protocol.

The CAN controller accepts data payload and message ID from the application and sends the CAN compliant message frame to CAN transceiver which transmits the analog signal on the bus (i.e., physical wires). The controller guarantees proper contention resolution operations, such as back-off if arbitration between two simultaneous transmitters is lost, ensuring proper transmission of error frames, message ID filtering, and maintenance of inter-frame spacing (IFS).

The CAN controller logic is typically implemented in hardware. Hence, it is assumed that adversaries restricted to software manipulation cannot modify the behavior of the CAN controller. Thus, the messages transmitted on the bus were assumed to be CAN compliant.

In some modern ECUs, the CAN controller and the processor are part of the same physical package, this can be accomplished as a multi-chip module (MCM) or monolithically by integrating a CAN controller peripheral with a processor, thus exposing new interfaces to the MCU, including a clock control interface and a power control interface. The new interfaces, illustrated in FIG. 2 are typically invisible to the application and used by low level device drivers to optimize the power consumption of the chip and during debug operations. However, such interfaces can be utilized by a malicious software to influence the structure of the messages transmitted on the bus. Generally, the CAN system clock is derived from the either the MCU system Clock or from an external oscillator. This provided for a possible CAN system clock frequency that typically is limited to whole fractions of the MCU system clock or oscillator by a prescaler. The CAN system clock is chosen so that the desired CAN bus Nominal Bit Time (NBT) is an integer number of time quanta (CAN system clock periods), for example from 8 to 25. For example, consider a Bit rate of 125 k bit per second, Bus length=50 m, Bus propagation delay=5×10-9 sm-1, Physical Interface (transmitter plus receiver) propagation delay of 150 ns at 85 C, and an MCU oscillator frequency=8 MHz. A prescaler value of 4 gives a CAN system clock of 2 MHz and a Time Quantum of 500 ns. This will give 8000/500=16 time quanta per bit.

FIG. 2 is a block diagram of a CAN stack 200 in an ECU having a coupled power control interface and clock. The CAN stack 200 includes a processor 202 such as a microcontroller, embedded processor, processor, application specific integrated circuit (ASIC), Field programmable gate array (FPGA), or similar device. The processor 202 communicates with a CAN controller 204 by sending and receiving data such as Message ID and data Payload and via interfaces including a clock interface and power control interface. The CAN transceiver 206 is the interface between the CAN protocol controller 204 and the physical wires of the CAN Bus.

FIG. 3 is a flow diagram of an attack precursor 300 on a CAN controller via arbitrary bit insertion. In step 302, a controller (e.g., controller 102, 202) enables a clock to a CAN controller (e.g., controller 104, 204). In step 304 the controller (e.g., controller 102, 202) configures the CAN controller (e.g., controller 104, 204) such as baud rate, message filters, and protocol (e.g., GM-LAN, FNOS, etc.).

In step 306, the controller (e.g., controller 102, 202) waits for an inter-frame spacing (IFS) detection (e.g., sequence of recessive bits after an end of frame (EOF) transmission) received from the CAN controller (e.g., controller 104, 204). In step 308 the controller (e.g., controller 102, 202) sends a packet to buffer (e.g., ID 0x00 and Payload 0101010) to the CAN controller (e.g., controller 104, 204). As the ID of 0x00 is all dominant bits, this ID would have the highest priority to access the bus. The ID 0x00 may be an 11-bit or 29-bit as part of the arbitration field (ARB) of the CAN message. In step 310, the controller (e.g., controller 102, 202) waits for arbitration to complete via the arbitration (ARB) field and a data length code (DLC) in a control (CTRL) field that is indicative of a transmission from the CAN controller (e.g., controller 104, 204). In step 312, the controller (e.g., controller 102, 202) disables the clock to the CAN controller (e.g., controller 104, 204). In step 314, the controller (e.g., controller 102, 202) attacks the CAN bus via malicious operation of the CAN bus that affects other modules on the CAN bus via the CAN controller (e.g., controller 104, 204).

Figure 4:
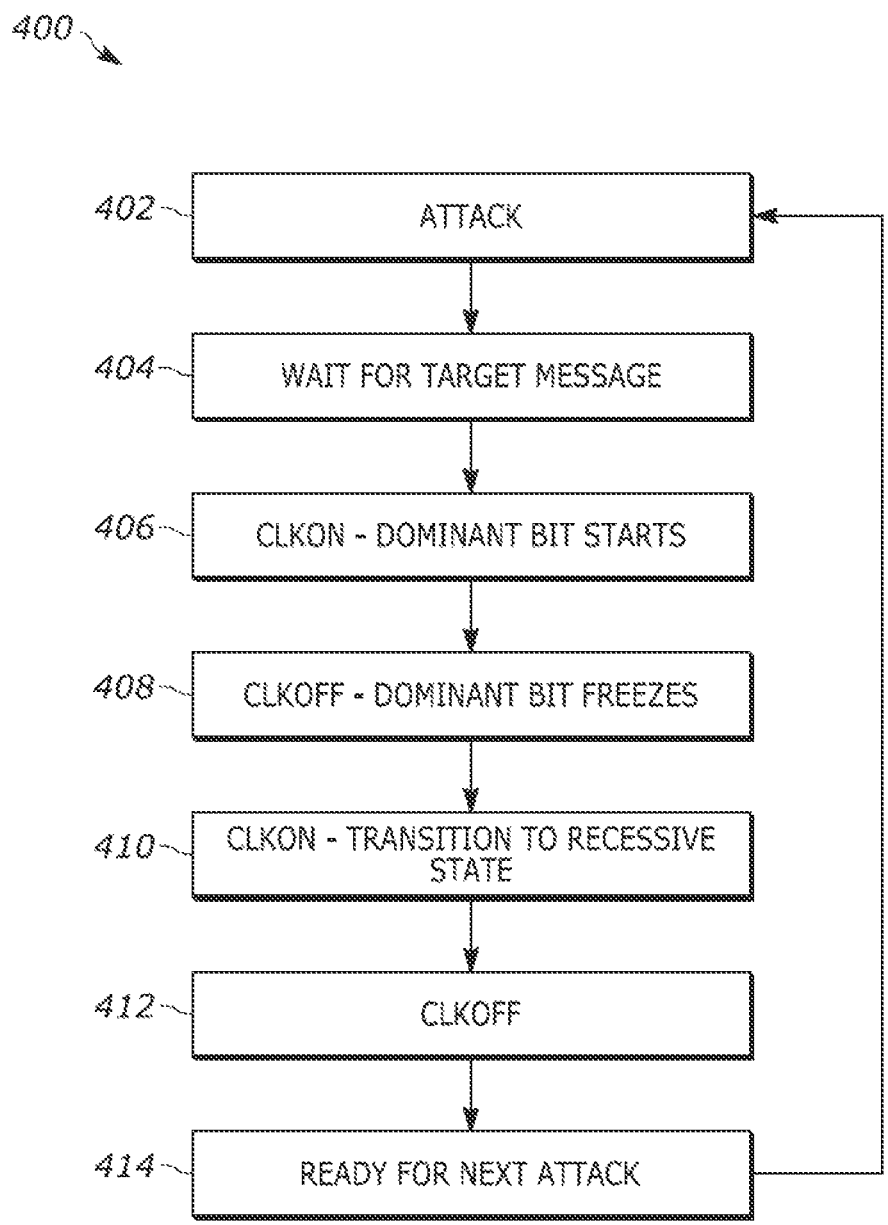
FIG. 4 is a flow diagram of a single dominant bit inserted for an arbitrary duration by a CAN controller.

FIG. 4 is a flow diagram of an attack 400 of a single dominant bit inserted for an arbitrary duration by a CAN controller. In step 402, a controller (e.g., controller 102, 202) begins an attack of a CAN bus via a message send to a CAN controller (e.g., controller 104, 204). In step 404 the controller (e.g., controller 102, 202) waits for a target message to be sent to the CAN controller (e.g., controller 104, 204). Here, the end of the waiting period may be triggered by an external signal or a Start of Frame (SOF) that is a single dominant bit preceded by at least 11 recessive bits. In step 406, the controller (e.g., controller 102, 202) enables a clock to the CAN controller with a dominate bit transmitted by the CAN controller (e.g., controller 104, 204). In step 408 the controller (e.g., controller 102, 202) disables the clock to the CAN controller (e.g., controller 104, 204) while the dominate bit is asserted on the CAN bus. In step 410, the controller (e.g., controller 102, 202) enables the clock to the CAN controller while transitioning the CAN bus to a recessive state output by the CAN controller (e.g., controller 104, 204). In step 412, the controller (e.g., controller 102, 202) disables the clock to the CAN controller (e.g., controller 104, 204). In step 414, the controller (e.g., controller 102, 202) branches to another attack of the CAN bus or other messages on the CAN bus via the CAN controller (e.g., controller 104, 204).

In FIG. 3 and FIG. 4, a general method to utilize the new interfaces to transmit a dominant bit (0 bit) of arbitrary length on the CAN bus is illustrated. The operations CLKOFF/CLKON denote the action of disabling and enabling the peripheral clock (clock gating) to the CAN controller. The implementation details of this operation varies with the specific MCU/ECU. For example, a method using the Arduino Due, is to utilize low level commands which are available in the Software Developers Kit (SDK), (e.g., pmc_disable_periph_clk). Similarly, the methods for measurement of low level timing to synchronize the actions varies for different MCUs.

The attack utilizes a message with ID 0x00 and an 8 byte payload with alternating zeros and ones (0101 . . . 01). This exemplary attack consists of two distinct phases. In the first phase, the high-priority message ID is transmitted, causing the CAN controller to go into a state for transmission of the payload. After waiting for transmission of the Return to Ready (RTR) bit, the command CLKOFF is used to disable the clock, freezing the state of the CAN controller (e.g., controller 104, 204). This prepares the controller (e.g., controller 102, 202) to transmit the message. Upon identification of a target message, the second attack phase begins. This consists of using the CLKON command to transmit the first dominant bit of the payload. The CLKOFF command is then used to freeze the controller in a dominant state. Once the dominant state is held for the desired duration, the controller is transitioned to the recessive state by successive CLKON and CLKOFF signals.

This mechanism allows transmission of a single dominant bit of arbitrary duration at the time of attacker's choice. The controlled pausing and release of the CAN controller state machine ensures that it is always ready to transmit the attack bit.

This disclosure illustrates new methods to protect an ECU (e.g., 100, 200)/CAN controller/Ethernet controller (e.g., controller 104, 204) from being used to transmit non-compliant messages. Regarding the CAN standard, all messages are typically referred to as frames, which includes data frames, remote frames, error frames, and overload frames. Information sent to the CAN bus must be compliant to defined frame formats of different but limited lengths. A non-compliant CAN frame includes is a frame that does not meet the specification set forth by the International Organization for Standardization (ISO) released CAN standard ISO 11898. Advantages to these systems and methods include:

First, methods to protect existing CAN systems against a new class of adversaries that were previously unknown and not protected against.

Second, Application of methods at different layers (e.g., hardware, application software, firmware, or built into a compiler), thus providing the system designer a variety of options based on the specific architecture. The hardware methods require minimal circuit redesign and overhead. Additionally, the methods provide flexibility such that they can be implemented by the owner of the CAN controller or by the overall system integrator.

Third, these methods are applicable to a variety of systems that utilize a CAN network, such as automotive, aerospace systems, industrial control systems, building control technologies. Further, the methods disclosed can be applied to general systems where clock control may be utilized to drive the peripheral into an undesired state.

An attack disclosed here utilizes the ability of the MCU (e.g., 102, 202) to perform a CLKON/CLKOFF operation from regular privilege software interfaces. Further, it relies on an assumption that the CAN controller maintains its state (frozen state) when the clock is disabled, without disabling the power. Thus, several countermeasures can be designed to prevent the occurrence of one or both of these conditions from software. In this disclosure a few countermeasures are illustrated including preventing clock disable, a reset on clock disable, trusted control of peripheral clock, and shutting down the attacker.

Preventing clock disable is a key aspect to prevent against attacks to the CAN controller to inhibit the ability to arbitrarily disable the clock and thereby pause the state of the CAN controller is in the middle of a transmission. Disabling the clock enables an attacker to potentially transmit partial and selective message bits. Preventing the clock from being disabled at arbitrary times is one technique to prevent arbitrary control.

Figure 5:
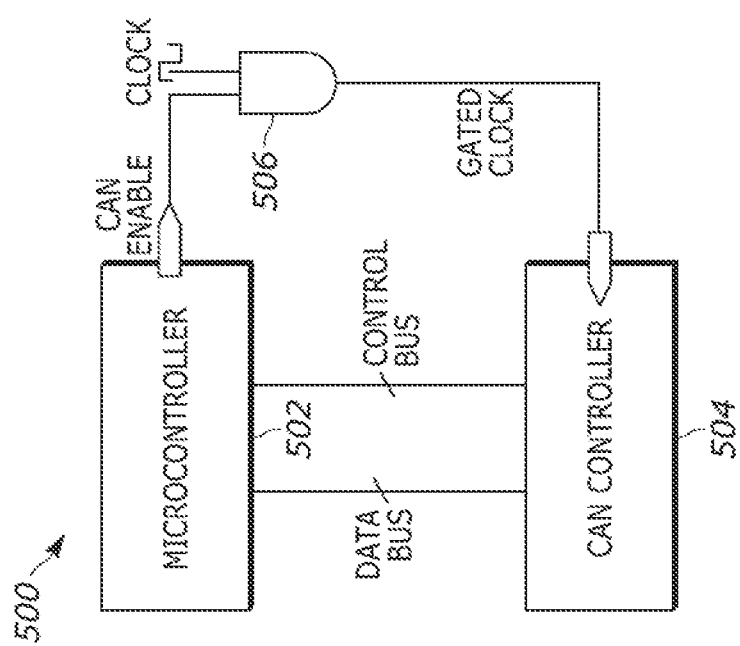
FIG. 5 is a block diagram of clock gating for a CAN controller.

Based on the implementation of the clock gating logic, several designs are possible for controlling the clock disable feature. An example of the traditional clock gating mechanism, using active high enable signal, is illustrated in FIG. 5. FIG. 5 is a block diagram of an ECU 500 having clock gating for a CAN controller. The processor 502 communicates with a CAN controller 504 via a control and data bus.

Figure 6:
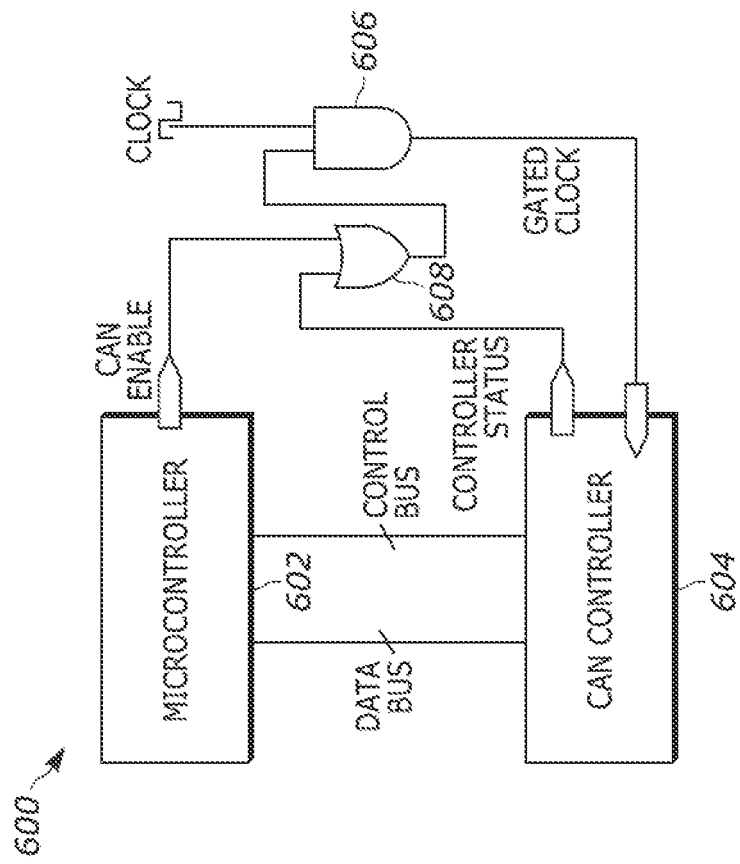
FIG. 6 is a block diagram of clock gating via status and enable for a CAN controller.

Additionally, the processor 502 includes an input/output (I/O) pin that can be used to gate the clock via logic 506 such as a AND gate. The I/O pin preforms a CAN Enable function gating the clock. FIG. 6 is a block diagram of clock gating via status and enable for a CAN controller.

FIG. 6 is a block diagram of an ECU 600 having a data bus and control bus, and a gating clock via status and enable for a CAN controller. The processor 602 communicates with the CAN controller 604 via a data bus and control bus, and the clock gating logic 606 is further qualified by additional logic 608 such as a signal from the CAN controller 604 that is indicative of the CAN controller status. The system in FIG. 6 utilizes an additional indicator line denoting the state of the CAN controller. Such a state can be a combination of different signals within the CAN controller that denote a busy state. An example of such a mechanism is presented in FIG. 8, in which the content of the transmit buffer is used to prevent clock gating. For example, the controller can only be disabled when all pending messages have been transmitted.

FIG. 8 is a block diagram 800 of a CAN controller 802 having a transmit buffer status based on a value of a transmit buffer(s) 806. The CAN controller has a shift register 804 that is configured to convert data from the transmit buffer(s) 806 to a serial stream of data to be sent via CAN Tx. The transmit buffer(s) 806 also includes logic 808 to generate a controller status output based on a value or status of the transmit buffer(s) 806.

It should be noted that such an additional signal can prevent the CAN controller from transitioning into low-power mode by consistently adding data to the transmit buffers. This can be exploited by and adversary to cause Denial of Service (DoS) attacks as well. However, this can be prevented by disabling additional messages from being sent to the controller queue after the clock disable signal has been triggered. An example of such a system is presented in FIG. 7, where the entire interface between the MCU and controller is disabled if the clock signal to the controller is disabled. Based on the specific implementation, only a subset of the interface signals, responsible for initiating new activities, may be disabled. FIG. 7 is a block diagram of an ECU 700 having clock, data bus, and control bus gating via status and enable for a CAN controller. The processor 702 communicates with the CAN controller 704 via a gated data bus and gated control bus, where the gating mechanism is controlled by the clock enable signal. The clock gating logic 706 is further qualified by additional logic 708 such as a signal from the CAN controller 704 that is indicative of the CAN controller status.

Reset on clock disable is another circuit and method of protecting the integrity of CAN communication. This is based on the enabler for the attack being the persistence of the CAN controller state after disabling the clock. Thus, an alternative mitigation strategy can be to ensure that the controller is reset to a safe or initialized state if the clock is disabled for a sufficiently long duration. Based on the architecture of the CAN controller, several designs are feasible to ensure the reset of the controller state.

In a simple solution, a reset system is designed using the signal to disable the clock. Such a system is useful in scenarios where an additional port is available via the controller block to accommodate the clock disable signal. Based on the controller architecture, and reset mechanism supported by the sequential logic elements, the system can generate synchronous or asynchronous reset signals.

For prevention of the simplest attack, it is required that the signal be used to reset at least the transmit buffers. It should be noted that value of configuration registers, such as bus speed, acceptance filters, sampling point do not present a security threat and do not require to be reset. This would considerably reduce the latency of CAN setup upon re-enabling the clock.

Figure 9:
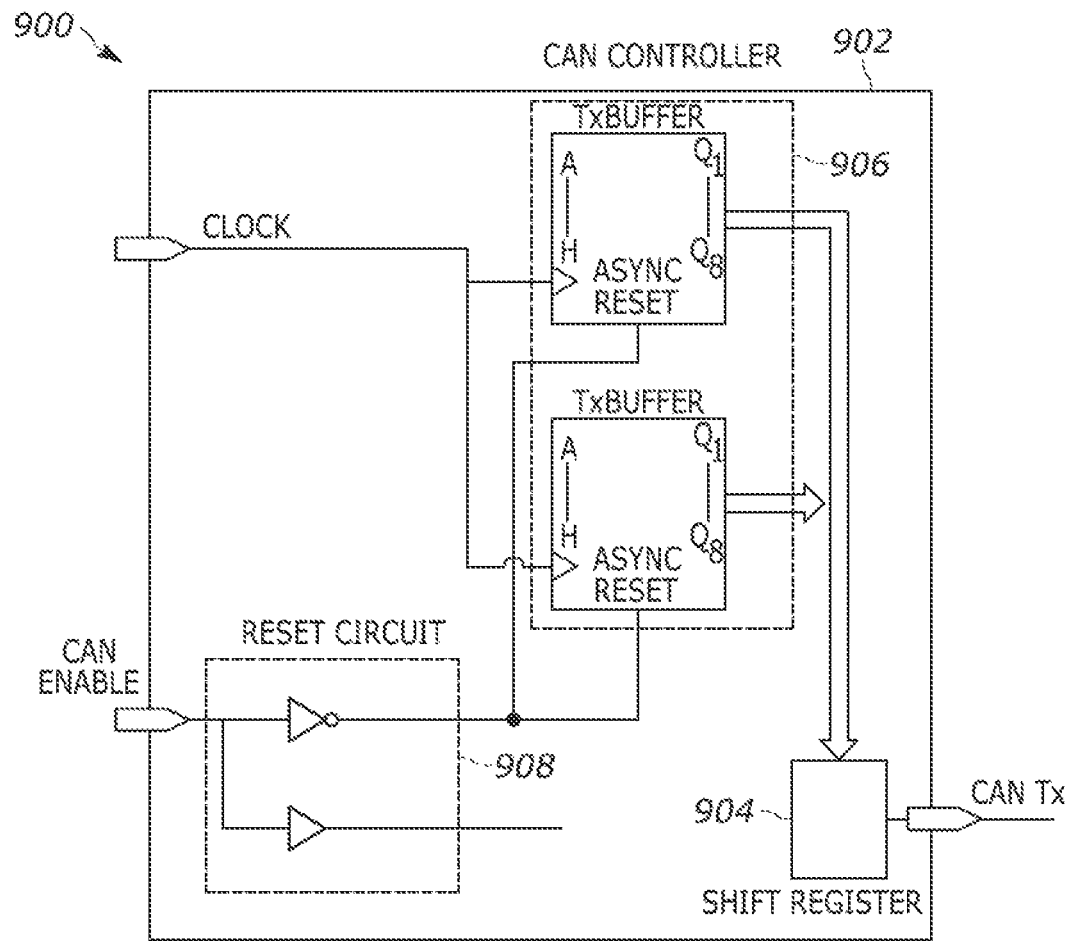
FIG. 9 is a block diagram of a reset circuit to reset the transmit buffers via an asynchronous reset signal.
Figure 10:
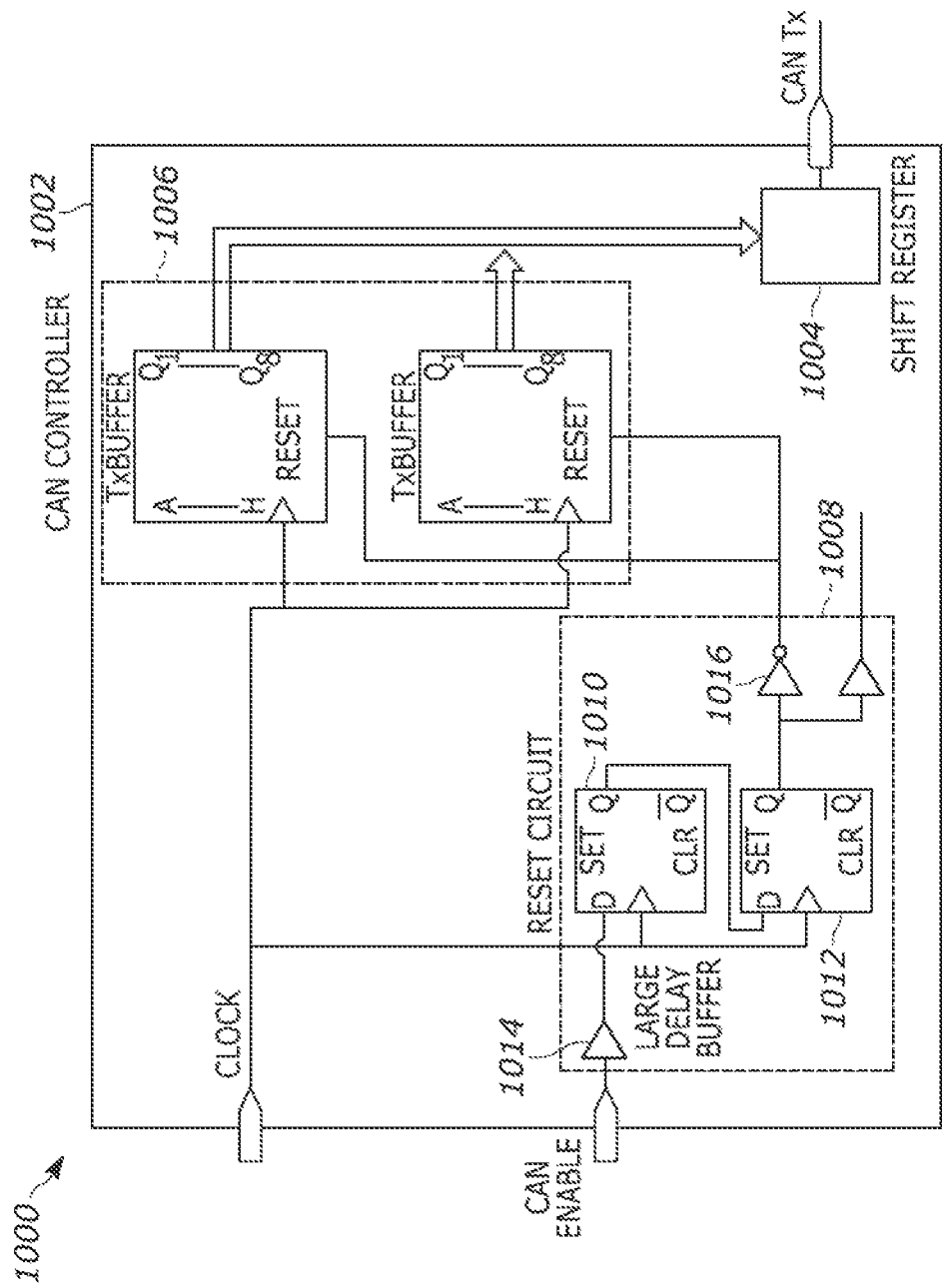
FIG. 10 is a block diagram of a reset circuit to reset the transmit buffers via a synchronous reset signal.

FIG. 9 is a block diagram of a reset circuit to reset the transmit buffers via an asynchronous reset signal. The CAN controller has a shift register 904 that is configured to convert data from the transmit buffer(s) 906 to a serial stream of data to be sent via CAN Tx. The transmit buffer(s) 906 also includes logic 908 to generate a reset of the transmit buffer(s) 906 based on a clock enable input. The logic 908 may include delay buffers FIG. 10 is a block diagram of a reset circuit to reset the transmit buffers via a synchronous reset signal. The CAN controller has a shift register 1004 that is configured to convert data from the transmit buffer(s) 1006 to a serial stream of data to be sent via CAN Tx. The logic 1008 is used to generate a synchronous reset signal. The logic 1008 may include a DQ flip-flops as shown with delay buffers such that the reset to the transmit buffer is synchronous to the clock.

FIG. 9 illustrates a simple scenario in which the clock enable signal is used to directly and asynchronously reset the transmit buffers. An alternative method for resetting the sequential elements synchronously is illustrated in FIG. 10. In which a combination of D flip-flops that are triggered by inverse clock edges, and a sufficiently large delay buffer on the input is used to ensure that the transmit buffers are reset once the clock signal is disabled. To ensure proper operation, the delay of the input buffer ($d_{buf}$) should be greater than the clock skew ($t_{skew}$) of the controller. This ensures that the propagation of the enable signal is sufficiently delayed to reset the controller state.

In architectures in which additional ports are not available, the reset generation logic must be inside the controller block. Thus, the clock signal must be checked for idle state, and used to reset the controller state.

Such a system requires the following components:

A clock-high hold detection circuit, consisting of the clock signal and providing an output indicating clock held if the signal is constant for a period greater than twice the maximum clock period. In other embodiments, clock hold detection circuit may be a multiple of 1.5, 2, 3, 4, 5, 10, 20 times the maximum clock period or other appropriate period based time.

A clock-low hold detection circuit, consisting of the clock signal and providing an output indicating clock held if the signal is constant for a period greater than twice the maximum clock period.

A reset generation mechanism that takes the output of the clock hold detection and outputs the reset signal for the controller elements.

Figure 11B:
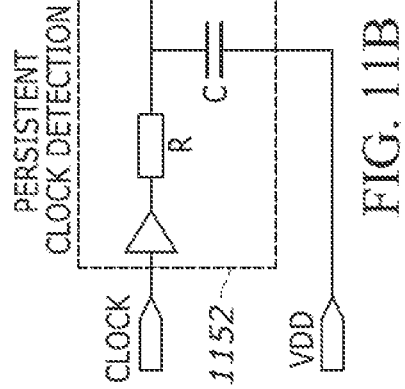
FIG. 11B is a block diagram of a detection circuit to detect a persistent low clock signal.
Figure 11A:
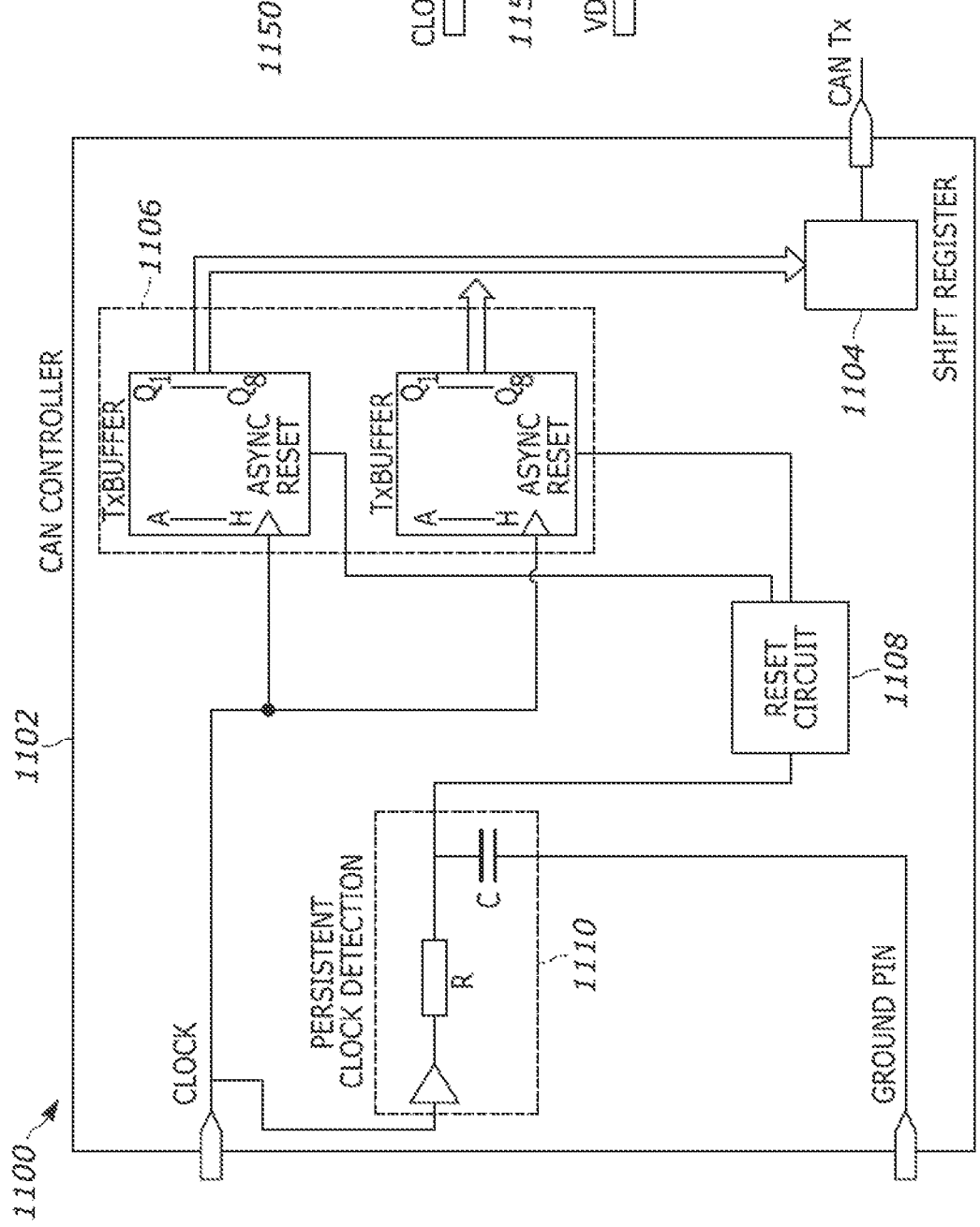
FIG. 11A is a block diagram of a detection circuit to detect a persistent high clock signal.

FIG. 11A is a block diagram of a CAN control system 1100 with a CAN controller 1102 having a detection circuit 1110 to detect a persistent high clock signal with a reset circuit 1108 configured to reset the CAN controller 1102 and transmit buffer(s) 1106. The CAN controller 1102 has a shift register 1104 that is configured to convert data from the transmit buffer(s) 1106 to a serial stream of data to be sent via CAN Tx. The CAN controller 1102 also includes persistent clock detection logic 1110 and a reset circuit 1108 to generate a reset to the transmit buffer(s) 1106. The persistent clock detection logic 1110 is configured to detect a persistent high clock signal. An alternative embodiment is illustrated in FIG. 11B that is a block diagram of a detection system 1150 with a detection circuit 1152 to detect a persistent low clock signal.

Figure 12:
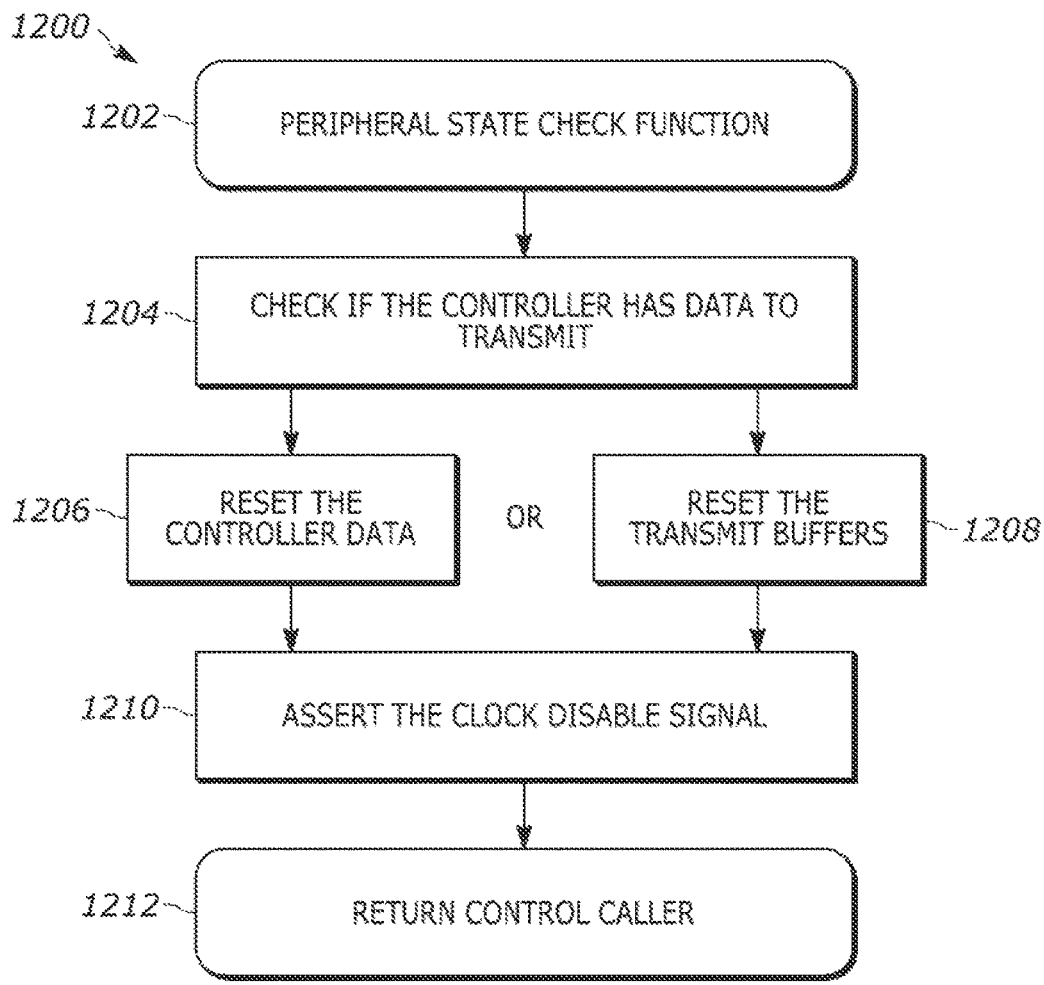
FIG. 12 is a flow diagram of a peripheral state check function.

FIG. 12 is a flow diagram of a peripheral state check function 1200. In step 1202, a controller (e.g., controller 102, 202) checks the state of the peripheral module (e.g., CAN controller, Ethernet controller, etc.) it restores the peripheral to operation mode (restoration of the peripheral includes resetting transmit buffers to zero, reinitializing the peripheral, re-execution of the peripheral initialization, or similar). Step 1202 is the start of the function which is called if someone attempts a clock disable during a partial transmission. In step 1204 the controller (e.g., controller 102, 202) checks if an attempt to disable the clock during a partial transmission occurs. If so, the controller will reset the controller data in step 1206, reset the transmit buffers in step 1208, or both. Resetting the controller data in step 1206 includes reinitializing the peripheral, re-execution of the peripheral initialization, or toggling a module reset via a pin or register. Resetting the transmit buffers in step 1208 includes writing all zeros to the transmit buffer. The controller will proceed to step 1210 in which the controller will assert the clock disable clock signal. If in step 1204 the transmit buffers are empty, the controller will jump to step 1210.

Figure 13:
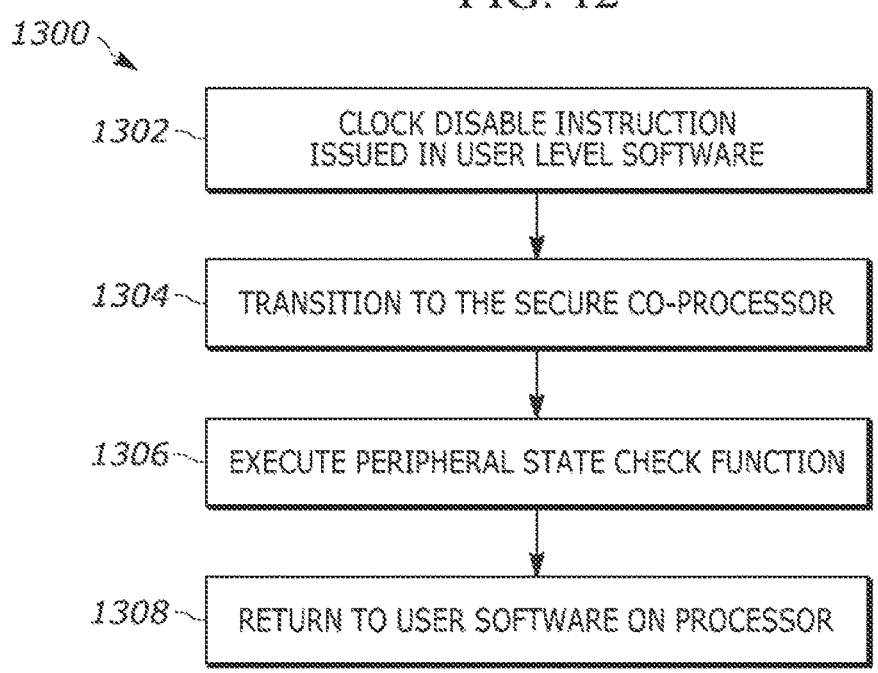
FIG. 13 is a flow diagram of a peripheral state check function via a secure co-processor.

FIG. 13 is a flow diagram of a peripheral state check function via a secure co-processor 1300. In Step 1302 a controller (e.g., controller 102, 202) proceeds to step 1304 if a clock disable instruction is issued while the controller is in a user level operation mode. In step 1304, the controller transitions to operation via a secure co-processor, (e.g., a secure co-processor, a Hardware Security Module, Trust Zone (in select ARM processors), a Secure Guard Extension (SGX) (in select Intel processors), Secure Encrypted Virtualization Technology (in select AMD processors), a trusted platform module) or more generally through a Trusted Execution Environment (TEE), which can be bootstrapped through a secure processor or coprocessor but it can also be instantiated via a combination of software and hardware. The TEE should run in an isolated environment where operations on data, code or a combination of both run securely (where securely refers to the integrity but also possibly to confidentiality of the data). In cases where the TEE is instantiated via a combination of software and hardware, the software needs to be protected from tampering/modification by other means (for example by storing it in read-only memory). In step 1306, the secure co-processor executes a peripheral state check function such as illustrated in FIG. 12. For example, the secure co-processor checks if an attempt to disable the clock during a partial transmission occurs. If so, the secure co-processor will reset the controller data as in step 1206, reset the transmit buffers as in step 1208, or both. Then the secure co-processor will disable the clock and proceed to step 1308. In step 1308, the secure co-processor will return operation to the controller operating in user mode.

An example of a simple capacitor circuit that can be used to detect such persistent clock high state is depicted in FIG. 11A. In this, the time constant of the capacitor circuit should be adjusted such that the clock signal operating at the lowest frequency that the controller is designed for, does not trigger a change in the binary state of the capacitors. This can be achieved by ensuring that $\tau=RC>1/(\ln(2)*f_{min})$, where $f_{min}$ is the minimum operation frequency of the CAN controller. A similar discharging, illustrated in FIG. 12 circuit can be used to detect a gated clock that is in the low (0) state.

Figure 14:
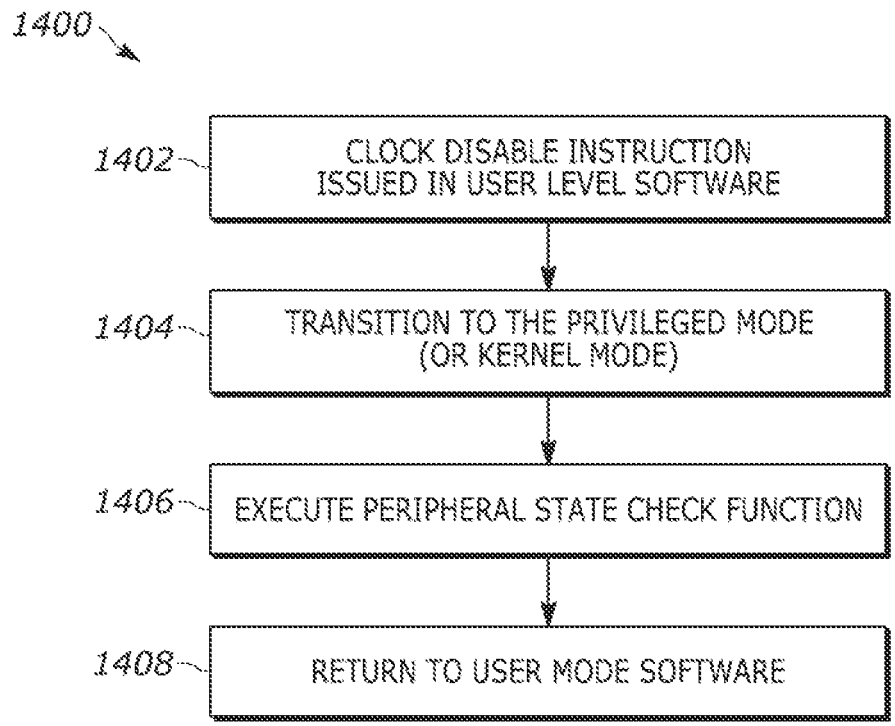
FIG. 14 is a flow diagram of a peripheral state check function via a transition to secure operation mode.

FIG. 14 is a flow diagram of a peripheral state check function via a transition to secure operation mode 1400. In Step 1402 a controller (e.g., controller 102, 202) proceeds to step 1404 if a clock disable instruction is issued while the controller is in a user level operation mode. In step 1404, the controller transitions to a secure operation mode (e.g., from a user mode to a supervisor mode, from an application mode to a kernel mode). In step 1406, while in the secure operation mode, the controller executes a peripheral state check function such as illustrated in FIG. 12. For example, the controller while in the secure operation mode checks if an attempt to disable the clock during a partial transmission occurs. This may include reading and/or writing registers that are not accessible in the unsecure operation mode. If so, the controller while in secure operation mode will reset the controller data as in step 1206, reset the transmit buffers as in step 1208, or both. Then the controller will disable the clock and proceed to step 1408. In step 1408, the controller will transition from secure operation mode to unsecure operation mode (e.g., user mode, application mode).

For both of these systems, the reset generation mechanism simply consists of a buffer that can be connected to the asynchronous reset pins of the controller elements. Alternatively, the reset signal can be connected to the reset pin of the whole peripheral or be used to trigger a hardware interrupt that resets the controller state.

Figure 15:
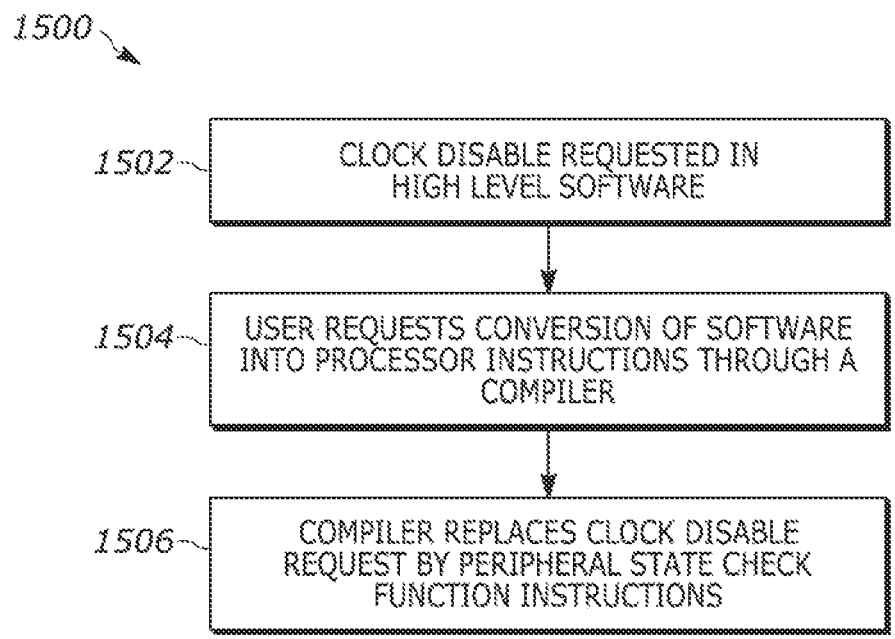
FIG. 15 is a flow diagram of a peripheral state check function via a compiler directive.

FIG. 15 is a flow diagram of a peripheral state check function via a compiler function 1500 to fill clock disable with FIG. 12. In this embodiment, a compiler includes a clock disable function in which the clock disable includes a peripheral state check function prior to execution of the clock disable. During code generation, when the programmer enters a disable clock function to the communication peripheral (e.g., disable CAN clock, disable Ethernet clock) such as in step 1502, the compiler will insert code to perform a peripheral state check function (a function call, inline code, or a combination thereof). In step 1504 the code is processed via a compiler/assembler/linker to generate instructions for the processor. In step 1506, the compiler replaces the clock disable call with the state check function.

Although this example is a compiler, this can also be used in a virtual machine environment such as JAVA, Parrot virtual machine, Common Language Runtime (CLR) or other runtime virtual machine.

Another embodiment is a system and method to provide protection operation of the CAN controller with trusted control of the peripheral clock. With the CAN controller being integrated with the processor and often packaged in a single package, the ability to perform CLKON/CLKOFF from non-privileged software is a critical component in enabling the attack. In many cases, these systems typically leave the check to ensure that the transmit buffers are flushed to the software designer. While such low level control provides a greater control to the system designers, it can be misused by an adversary.

The purpose of the CLKON/CLKOFF feature is to optimize the chip power consumption and thus, based on the use-case, not required frequently from the application software. To prevent misuse, such functionality can be offloaded to the trusted pieces of code, such as low level device drivers or components running in a secure module such as a Hardware Security Module (HSM) that validates the state of the controller prior to disabling the clock.

Figure 16:
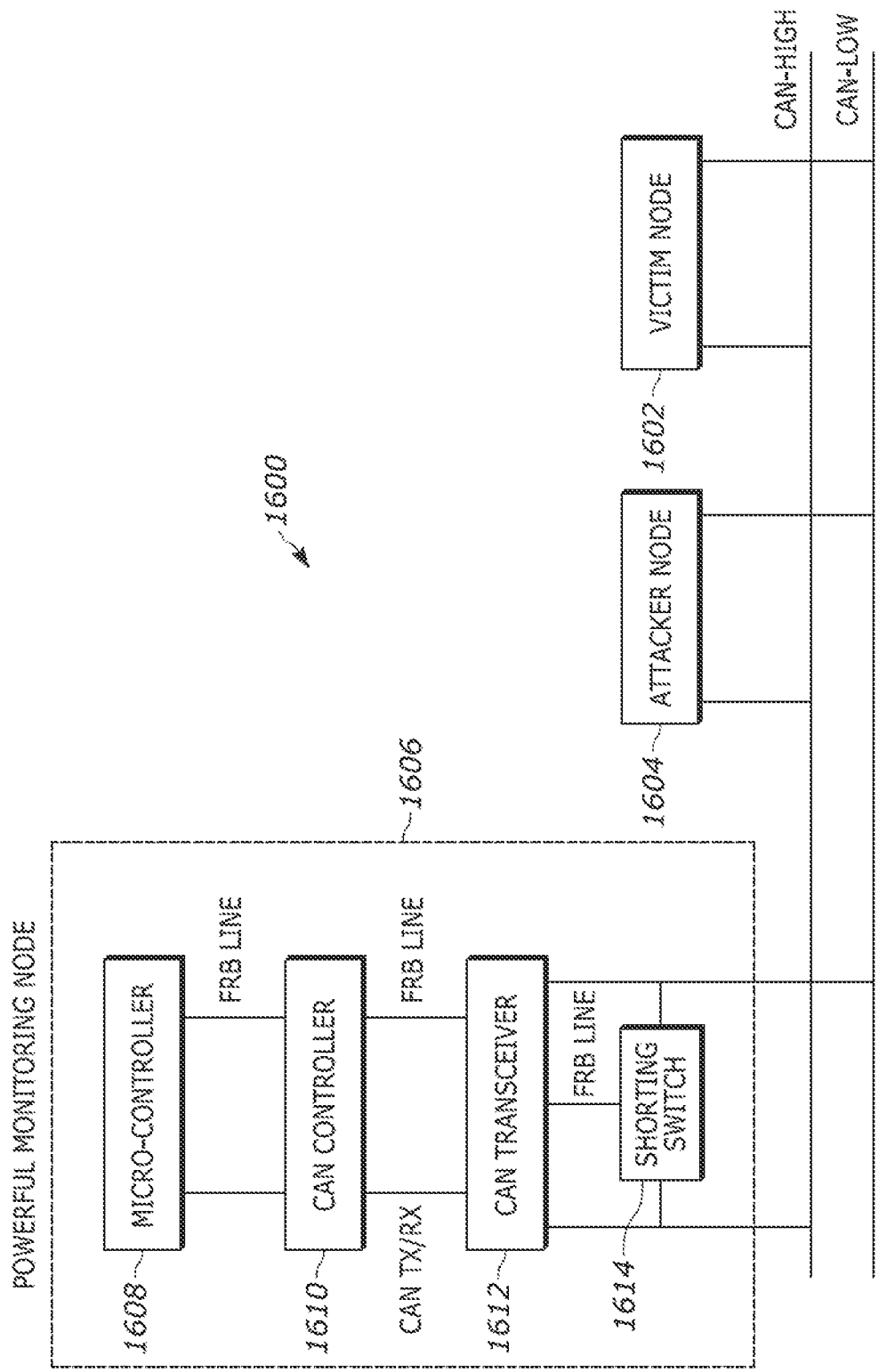
FIG. 16 is a block diagram of a communication bus including a supervisor node, attacker node, and target node.

FIG. 16 is a block diagram of a communication system 1600 including a supervisor node 1606, an attacker node 1604, and a target node 1602. The monitoring node 1606 includes a microcontroller 1608, a communication controller 1610 (e.g., a CAN controller, an Ethernet controller), a communication transceiver 1612 (e.g., a CAN transceiver, an Ethernet transceiver), and a shorting or shunt device. The shunt can be a metal oxide semiconductor field effect transistor (MOSFET), a bipolar junction transistor (BJT), a relay, or other switching component.

One embodiment of a MCU with a secure processor (or HSM) may be implemented via an architecture with a clock-state change request function which can be implemented as an interrupt to the secure processor (or enclave). The secure processor includes a direct request to change the state of the peripheral clock (either activate or deactivate), an alternative request includes a mode change request to change the state of the peripheral clock based on mode rules (e.g., HALT mode, STOP mode, SAFE mode, TEST mode, etc.). A peripheral state check function, can run within the secure processor or trusted environment, and include a check of peripheral's status registers for an active transmit buffer (either a buffer that is not empty or one that is actively transmitting), a check of the peripheral's bus state, such as an active transmission from some device in the network.

A system or method using signed (or trusted) code can replace the default peripheral state check function. This system or method would ensure that the user still has low level control, however that control can only be exercised in a secure enclave.

With MCUs that do not have a secure co-processor (or HSM), an embodiment to implement such a request and check functionality can be via low level drivers which are implemented in the firmware. In another embodiment in which custom compilers (or extensions) are provided by the integrated circuit (e.g., processor, embedded processor, microcontroller, ASIC, etc.) chip manufacturer to translate the high level code into low level binaries, the logic for implementing such checks can be added by the compiler for every peripheral request.

Another embodiment includes a list of trusted authorities and methods to validate cryptographic signatures from the trusted authorities, wherein the protected peripheral state function can be defined by a user by providing a trusted instructions consisting of the instructions and a cryptographic signature over the instructions issued by a trusted authority in the list.

It should be noted that adding such instructions, subroutines, function, etc. to a compiler does not protect against adversaries that directly manipulate runtime software, using techniques such as Return-Oriented-Programming. However, these additions can provide an additional layer of robustness that can be used in conjunction with other techniques disclosed here.

Shutting down the attacker is the next step. The methods disclosed here can be used to improve the robustness and security of a controller that is controlled by an adversary. In scenarios where the adversary manages to circumvent all such protections, additional countermeasures can be implemented in other nodes connected to the bus that can disable (or attack) the adversary, thus minimizing the damage an adversary can cause.

First assume that some of the nodes on the network have additional monitoring capabilities that can be used to detect such bit insertion attacks. These nodes can include powerful nodes such as the gateway ECU or the body controller.

Upon detection of malicious behavior, a node can forcibly inject recessive bits during a malicious error frame injection by an attacking ECU. To insert such bits, a node requires the following additional components, A switch (e.g., metal oxide semiconductor field effect transistor (MOSFET), Bipolar junction transistor (BJT), gate, bridge, or relay) in the CAN transceiver that can bridge the connection between the CAN bus lines (e.g., CANH and CANL). Inducing a recessive bit using the switch causes an intentional short duration short circuit on the CAN bus. This intentional short can typically be handled by the nodes without issue.

A forced recessive bit signal can be used to activate the switch. Such a signal can typically be provided by adding additional logic to function as an interface between the controller and the transceiver.

In one embodiment, where the detection logic is present in the processor and not in the CAN controller, an additional signal is required between the MCU and the CAN controller that can be used to signal the forced recessive bit. In another embodiment, a signal can be directly connected between the MCU and the transceiver, thereby bypassing the controller.

Such capability can be used to induce bit faults in the attacker, thus causing it to go in a bus-off (or reset) state. It should be noted that addition of such a capability requires deviation from the typical design of CAN transceivers and controllers, requiring additional capabilities. Such additions must be performed in compliance with the CAN protocol.

In scenarios where an attacker node transmissions can be identified using physical characteristics of the transmissions (such as clock skew, voltage level or transients), the node can be disabled by puncturing any recessive bits in the adversary setup phase, (e.g. in the data length segment of the message). Such a method requires additional low-level detection capabilities, but no additional circuit to bridge the bus lines. Instead, it requires the CAN controller to have the ability to inject a forced dominant bit that can be used to transmit a bit even when the node is not in control of the bus.

The attack may rely on the same functionality implemented in software, thus the injection of the forced bits can to be controlled through a secure co-processor (or HSM).

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. An electronic control unit (ECU) comprising:
a processor;
a Controller Area Network (CAN) controller having a status and configured to
receive data and control signals from the processor, wherein the CAN controller is further configured to communicate a clock signal,
package the data to create a CAN protocol frame held in at least one transmit buffer, and
shift the CAN protocol frame to a CAN transceiver that is configured to transmit the CAN protocol frame to a CAN bus; and
security gating logic configured to, in response to the status of the CAN controller being active, inhibit disabling of a clock signal.

2. The electronic control unit of claim 1, wherein the status is active if the CAN controller is actively transmitting the CAN protocol frame.

3. The electronic control unit of claim 2, wherein the status is active if at least one transmit buffers has transmission data indicating that an inhibit clock stop signal is asserted if any bit of the at least one transmit buffer is a logic 1.

4. The electronic control unit of claim 1, wherein the security gating logic includes a persistent clock detection signal that is generated when the clock does not change state for a period greater than a threshold accepted clock period.

5. The electronic control unit of claim 1 further including a data transfer gate and a control signal transfer gate, wherein, transmission of data and control signals through the data transfer gate and the control signal transfer gate is inhibited based on the control signal.

6. The electronic control unit of claim 1, wherein the security gating logic is further configured to reset the CAN controller when a clock enable signal is inactive.

7. The electronic control unit of claim 1, wherein the CAN bus includes a CAN High and CAN Low signal, and the CAN transceiver is further configured to short the CAN High and CAN Low signals.

8. The electronic control unit of claim 1, wherein the security gating logic is further configured to detect a non-compliant CAN frame on the CAN bus.

9. The electronic control unit of claim 8, wherein in response to detection of a non-compliant CAN frame on the CAN bus, inject a recessive bit onto the CAN bus.

10. The electronic control unit of claim 8 further including a connection between the processor and the CAN transceiver, wherein, in response to detection of a non-compliant CAN frame on the CAN bus, inject a recessive bit onto the CAN bus.

11. An electronic control unit (ECU) comprising:
a processor;
a controller configured to:
receive data and control signals from the processor,
package the data to include a protocol frame held in at least one buffer, and
shift the protocol frame to a transceiver via a shift buffer, wherein the transceiver is configured to receive serial data from the controller and transmit a signal on a bus;
clock gating logic configured to selectively disable a clock to the controller based on a signal from the processor; and
security gating logic configured to, in response to a status of the controller being active, inhibit disabling the clock.

12. The electronic control unit of claim 11, wherein the controller is an Institute of Electrical and Electronics Engineers (IEEE) 802 Ethernet controller, the protocol frame is an Ethernet protocol frame, the transceiver is an Ethernet transceiver, and the bus is an Ethernet bus.

13. The electronic control unit of claim 11, wherein the controller is a Controller Area Network (CAN) controller or a Flexray controller.

14. The electronic control unit of claim 13, wherein the security gating logic includes a persistent clock detection signal that is generated when the clock does not change state for a period greater than a threshold accepted clock period.

15. The electronic control unit of claim 13, wherein the security gating logic is further configured to detect a non-compliant CAN frame on the CAN bus, and in response to detection of a non-compliant CAN frame on the CAN bus, force a recessive bit onto the CAN bus.

16. An electronic control unit (ECU) comprising:
a processor;
a controller configured to:
receive data and one or more control signals from the processor,
package the data to include a protocol frame held in at least one transmit buffer, and shift the protocol frame to a transceiver via a shift buffer, wherein the transceiver is configured to receive serial data from the controller and transmit the protocol frame on a bus;
clock gating logic configured to selectively disable a clock to the controller based on the one or more control signals from the processor; and
security gating logic configured to, in response to a status of the controller indicating active transmission of the protocol frame, inhibit disabling the clock.

17. The electronic control unit of claim 16, wherein the security gating logic includes a persistent clock detection signal that is generated when the clock does not change state for a period greater than a minimum accepted clock period.

18. The electronic control unit of claim 16, wherein the ECU includes a reset logic configured to reset the at least one transmit buffer when the control signal transitions from active to inactive, wherein the reset logic further outputs a reset signal synchronous to the clock.

19. The electronic control unit of claim 18, wherein the synchronous reset signal is generated by a buffer connected to a first D flip-flop that is triggered by a positive clock edge and connected to a second D flip-flop that is triggered by a negative edge.

20. The electronic control unit of claim 16, wherein the ECU includes a reset logic configured to reset the at least one transmit buffer when the control signal transitions from active to inactive, wherein the reset logic outputs a reset signal asynchronous to the clock.

\* \* \* \* \*